Jan. 10, 1956 J. S. DANDINI 2,730,631
CURRENT-DRIVEN MOTOR
Filed March 30, 1953

INVENTOR.
Juliana S. Dandini
BY
A. Schapp
Att'y

United States Patent Office 2,730,631
Patented Jan. 10, 1956

2,730,631

CURRENT-DRIVEN MOTOR

Juliana S. Dandini, Reno, Nev.

Application March 30, 1953, Serial No. 345,532

7 Claims. (Cl. 290—54)

The present invention relates to a current-driven motor, and its principal object is to provide a motor that is driven by the current of a flowing stream or body of water, without the use of fuel, and that will stay in operation automatically as long as the current flows, requiring little care and expense, except for the initial outlay in manufacturing the motor.

More particularly it is proposed to provide a motor of the character described that may be readily anchored to any suitable post or other anchoring means disposed within the body of water or along the banks thereof, requiring no further cost of installation.

It is further proposed to utilize for the purposes of the present invention, a hollow ball or sphere adapted to float on the body of water and provided with means for rotating the same in response to the current of the water.

It is additionally proposed to provide power-driven machinery on the inside of the ball and driving connections between the ball and the machinery for operating the latter.

And finally, it is proposed, in the preferred form of my invention, to provide two different kinds of machinery, one directed to the production of electrical current, and the other to the pumping of water from the body of water to any desired destination, for household or irrigating purposes.

Further objects and advantages of my invention will appear as the specification proceeds, and the new and novel features of same will be fully defined in the claims attached hereto.

Figure 1:
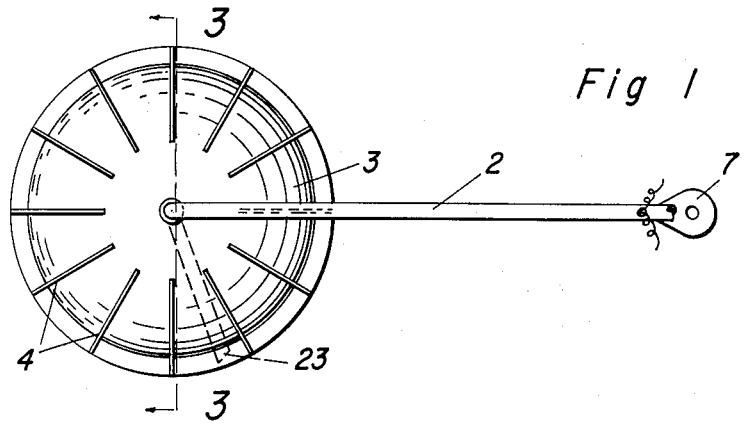
Figure 2:
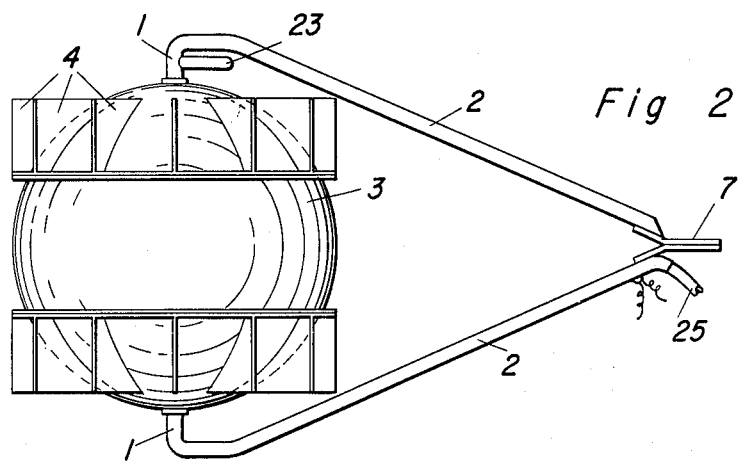

The preferred form of my invention is illustrated in the accompanying drawing, forming part of this application, in which:

Figure 1 shows a side view of my current-driven motor;

Figure 2, a top plan view of the same; and

Figure 3:
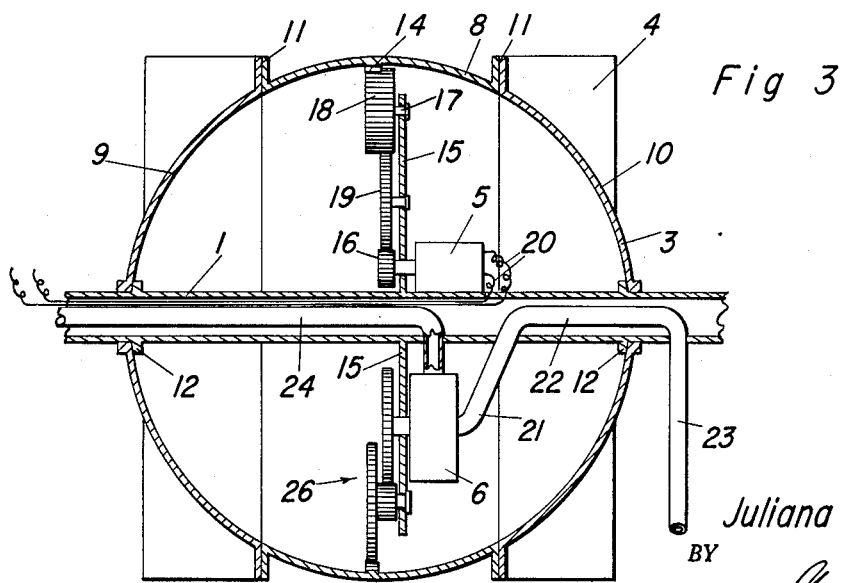

Figure 3, a central vertical section through the same as seen from line 3—3 of Figure 1.

While I have shown only the preferred form of the invention, it should be understood that various changes or modifications may be made within the scope of the claims attached hereto, without departing from the spirit of the invention.

Referring to the drawing in detail, my current-driven motor comprises in its principal features, a hollow shaft 1 having yoke-members 2 projecting from opposite ends thereof, a ball or sphere 3 revolvable on the shaft and having radial vanes 4 projecting therefrom, a generator 5 mounted on the shaft, a rotary pump 6 suspended from the shaft, and gearing establishing driving connection between the ball and the generator and the pump, respectively.

The shaft 1 extends axially through the ball, and is hollow to accommodate various instrumentalities hereinafter referred to.

The yoke-members or arms 2 project from the ends of the shaft, outside of the ball, and converge toward one another, terminating in a ring or eyelet 7 adapted for securing to a cable, which in turn may be fastened to any suitable anchoring means, such as a tree on the river bank or a post driven into the river bed.

The ball 3 may be made in any suitable manner, and is here shown as comprising three sections, a central one referred to by the numeral 8, and two outer ones referred to as 9 and 10.

The sections may be secured upon one another by flanges 11, and the ball may be held against endwise motion on the shaft by means of shoulders 12. It is free to rotate on the shaft and is of a weight and dimensions to float on the water, with the lower portion immersed therein.

The outer sections of the ball have fins or vanes 4 projecting radially therefrom and these fins are operable by the current of the water for rotating the ball.

While I have shown a ball as the preferred embodiment of the invention, it is apparent that other suitable, symmetrical bodies may be substituted, without departing from the spirit of the invention.

The ball carries, on its inner surface, a centrally located ring gear 14 arranged transversely to the shaft to transmit motion to the power-driven devices inside the ball, namely the generator 5 and the rotary pump 6.

The generator is mounted on top of the shaft, in fixed relation thereto and adjacent a disc 15 projecting transversely from the shaft, through which the generator shaft extends, as shown, the latter shaft carrying a pinion 16.

The disc 15 carries, near its periphery, a second shaft 17 having a gear wheel 18 meshing with the ring gear 14, and a large gear wheel 19 is interposed between gear wheel 18 and the generator pinion to transmit rotary motion from the ball to the generator shaft at an increased speed ratio.

The generator has suitable conductors 20 leading through the hollow shaft to any desired point outside the ball for connection to any suitable current consuming device such as a transformer, a motor, or an electric light system.

The rotary pump 6 is suspended from the shaft 1, and has an intake conduit 21 passing in part through the hollow shaft, as at 22, and having a downward extension 23 passing through the wall of the shaft, outside of the ball, to project into the body of water. It has an outlet conduit 24 passing through the central shaft, and possibly through one of the yoke-arms 2, to emerge, as at 25, for connection to a tank or any other water consuming means.

The pump 6 is driven by the ring gear 14 through any suitable gearing 26, having bearing in the disc 15.

In operation, the ring 7 is anchored, by means of a cable, or the like, to any suitable anchoring means, such as a tree or a post or a rock, with the ball arranged downstream of the anchoring means, and at a strategic point where the current is swift and continuous.

The current of the swift stream, acting on the fins, causes the ball to rotate about the shaft, and to transmit motion by the gearing shown, to the generator and the pump, respectively.

The electric current generated by the generator may be used for any suitable purpose, as for driving machinery, or operating an electric lighting system, and the water pumped by the pump may be used for irrigation purposes or may be collected in a tank or reservoir for future use.

It will be noted that both the generator and the pump are operated solely by the current, without fuel consumption, and run continuously, without any expense, except for maintenance and the initial cost of manufacture.

My current-driven motor may be readily installed, without expert help, and may be easily moved from place to place to take advantage of the best current of the stream which is available.

Since there is no cost involved in the operation of my apparatus, it is apparent that the original cost will be quickly depreciated, whereupon the device delivers water and electricity to the consumer at no cost.

I claim:

1. In a current-driven motor, a shaft having a yoke attached to opposite ends thereof with means for anchoring the free end of the yoke with respect to a flowing body of water, a hollow ball revolvable on the shaft and adapted for floating on the body of water, the ball having a plain central section and finned outer sections operable by the flowing water for rotating the ball, power-operated means fixedly mounted on the shaft, a ring gear mounted centrally on the inside of the central section and transversely to the shaft, a disc projecting from the shaft transversely near the plane of the ring gear, and gearing carried by the disc and interconnecting the ring gear and the power-operated means, the finned outer sections being separable from the plain inner section to afford access to the inner structure.

2. In a current-driven motor, a shaft having a yoke attached to opposite ends thereof with means for anchoring the free end of the yoke with respect to a flowing body of water, a hollow ball revolvable on the shaft and adapted for floating on the body of water, the ball having a plan central section and finned outer sections operable by the flowing water for rotating the ball, power-operated means fixedly mounted on the shaft and means mounted within the central section for transmitting motion from the ball to the latter means, the finned outer sections being separable from the plain central section whereby access may be afforded to the parts mounted within the central section.

3. In a current-driven motor, a shaft having means for anchoring the same with respect to a flowing body of water, a hollow ball revolvable on the shaft and adapted for floating on the body of water, the ball having a plain central section and finned outer sections operable by the flowing water for rotating the ball, power-operated means fixedly mounted on the shaft, and means mounted within the central section for transmitting motion from the ball to the latter means, the finned outer sections being separable from the plain central section whereby access may be afforded to the parts mounted within the central section.

4. In a current-driven motor, a shaft having means for anchoring the same with respect to a flowing body of water, a hollow ball revolvable on the shaft and adapted for floating on the body of water, the ball having a plain central section and finned outer sections operable by the flowing water for rotating the ball, a generator and a pump fixedly mounted on the shaft within the central section, one above and one below the shaft, a ring gear mounted centrally on the inside of the central section and transversely to the shaft, a disc projecting from the shaft transversely near the plane of the ring gear, and two sets of gearing carried by the disc for establishing driving relation between the ring gear and the motor and the pump, respectively, the two finned sections being separable from the central section to furnish access to the parts confined within the central section.

5. In a current-driven motor, a shaft having a yoke fixed to opposite ends thereof, a single cable attached to the bight of the yoke and adapted for fastening to an anchorage point adjacent a body of flowing water, a hollow ball revolvable on the shaft and adapted for freely floating on the body of water with freedom of swinging movement about said point of anchorage, fins on the ball operable by the flowing water for rotating the ball, power-operated means fixedly mounted on the shaft within the ball, and a driving connection between the ball and said means for operating the latter, the yoke being made to hold the shaft against rotation.

6. In a current-driven motor, a shaft having a yoke fixed to opposite ends thereof, a single cable attached to the bight of the yoke and adapted for fastening to an anchorage point adjacent a body of flowing water, a hollow ball revolvable on the shaft and adapted for freely floating on the body of water with freedom of swinging movement about said point of anchorage, fins on the ball operable by the flowing water for rotating the ball, power-operated means fixedly mounted on the shaft within the ball, and a driving connection between the ball and said means for operating the latter, the yoke being made to hold the shaft against rotation, and the driving connection comprising a ring gear mounted centrally on the inside of the ball transversely to the shaft, a disc mounted on the shaft adjacent the plane of the ring gear, and gearing carried by the disc and interconnecting the ring gear and the power-operated means.

7. In a current-driven motor, a hollow shaft having means for anchoring the same with respect to a flowing body of water, a hollow ball revolvable on the shaft and adapted for floating on the body of water, the ball having fins operable by the flowing water for rotating the same, a pump fixedly mounted on the shaft and having an intake conduit extending through the hollow shaft and downwardly into the body of water and having an outlet conduit extending through the hollow shaft toward a point of delivery, and transmitting means between the ball and the pump adapted for operating the pump.

References Cited in the file of this patent

UNITED STATES PATENTS

| 833,361 | Wilmore | Oct. 16, 1906 |
| 938,989 | Duncan | Nov. 2, 1909 |
| 1,263,865 | Dale | Apr. 28, 1918 |
| 2,097,286 | McGee | Oct. 26, 1937 |
| 2,222,790 | Van Scharrel | Nov. 26, 1940 |